(12) United States Patent
Trede et al.

(10) Patent No.: US 9,416,767 B2
(45) Date of Patent: Aug. 16, 2016

(54) ERECTING A WIND POWERPLANT

(71) Applicant: SENVION SE, Hamburg (DE)

(72) Inventors: Alf Trede, Immenstedt (DE); Oliver Heinecke, Hamburg (DE); Carsten Eusterbarkey, Simonsberg (DE)

(73) Assignee: SENVION SE, Hamburg (DE)

( * ) Notice: Subject to any disclaimer, the term of this patent is extended or adjusted under 35 U.S.C. 154(b) by 0 days.

(21) Appl. No.: 14/275,181

(22) Filed: May 12, 2014

(65) Prior Publication Data

US 2014/0319091 A1    Oct. 30, 2014

Related U.S. Application Data

(63) Continuation of application No. 12/336,980, filed on Dec. 17, 2008, now abandoned.

(30) Foreign Application Priority Data

Dec. 20, 2007 (DE) .......................... 10 2007 062 428

(51) Int. Cl.
| F03D 1/00 | (2006.01) |
| B66C 1/10 | (2006.01) |
| B66C 1/62 | (2006.01) |
| F03D 1/06 | (2006.01) |

(52) U.S. Cl.
CPC ................ F03D 1/001 (2013.01); B66C 1/108 (2013.01); B66C 1/62 (2013.01); F03D 1/0658 (2013.01); *F05B 2230/61* (2013.01); *Y02E 10/721* (2013.01); *Y02E 10/728* (2013.01); *Y02P 70/523* (2015.11)

(58) Field of Classification Search
CPC ......... F03D 1/001; F03D 1/003; F03D 1/005; F05B 2230/61; F05B 2240/916; F05B 2260/30
USPC .................................................. 29/889, 889.1
See application file for complete search history.

(56) References Cited

U.S. PATENT DOCUMENTS

| 7,207,777 B2 | 4/2007 | Bervang |
| 2008/0078128 A1 | 4/2008 | Livingston et al. |
| 2009/0324380 A1* | 12/2009 | Pedersen ........................ 414/800 |

FOREIGN PATENT DOCUMENTS

| DE | M 22947 | 3/1956 |
| DE | 34146 | 1/1964 |
| DE | 8418183 | 10/1984 |
| DE | 10028513 | 1/2002 |
| DE | 29924115 | 2/2002 |
| EP | 2154366 | 2/2010 |
| EP | 2118483 | 8/2010 |
| JP | 2005002875 | 1/2005 |
| WO | 03100249 | 12/2003 |
| WO | 2008132226 | 11/2008 |

* cited by examiner

*Primary Examiner* — Moshe Wilensky
(74) *Attorney, Agent, or Firm* — Rankin, Hill & Clark LLP

(57) ABSTRACT

A method for handling a wind powerplant's rotor hub or to handle a wind powerplant's rotor using a hoist, in particular for erecting a wind powerplant or for assembling or disassembling a rotor to and from such a powerplant, in particular a hub or a rotor being configured by means of one assembly side to the wind powerplant's tower, the hub or rotor being raised or held by the hoist. In the raised state, the hub is tilted by a tilting mechanism acting on it out of the initial, raised position by a predetermined angle of tilting, or the rotor is tilted by a tilting mechanism acting on the rotor blade roots of the rotor through a predetermined angle of tilting. A mechanism to handle a wind powerplant's rotor hub of a wind powerplant's rotor, in particular for assembling or dismantling a rotor to or from its wind powerplant.

7 Claims, 14 Drawing Sheets

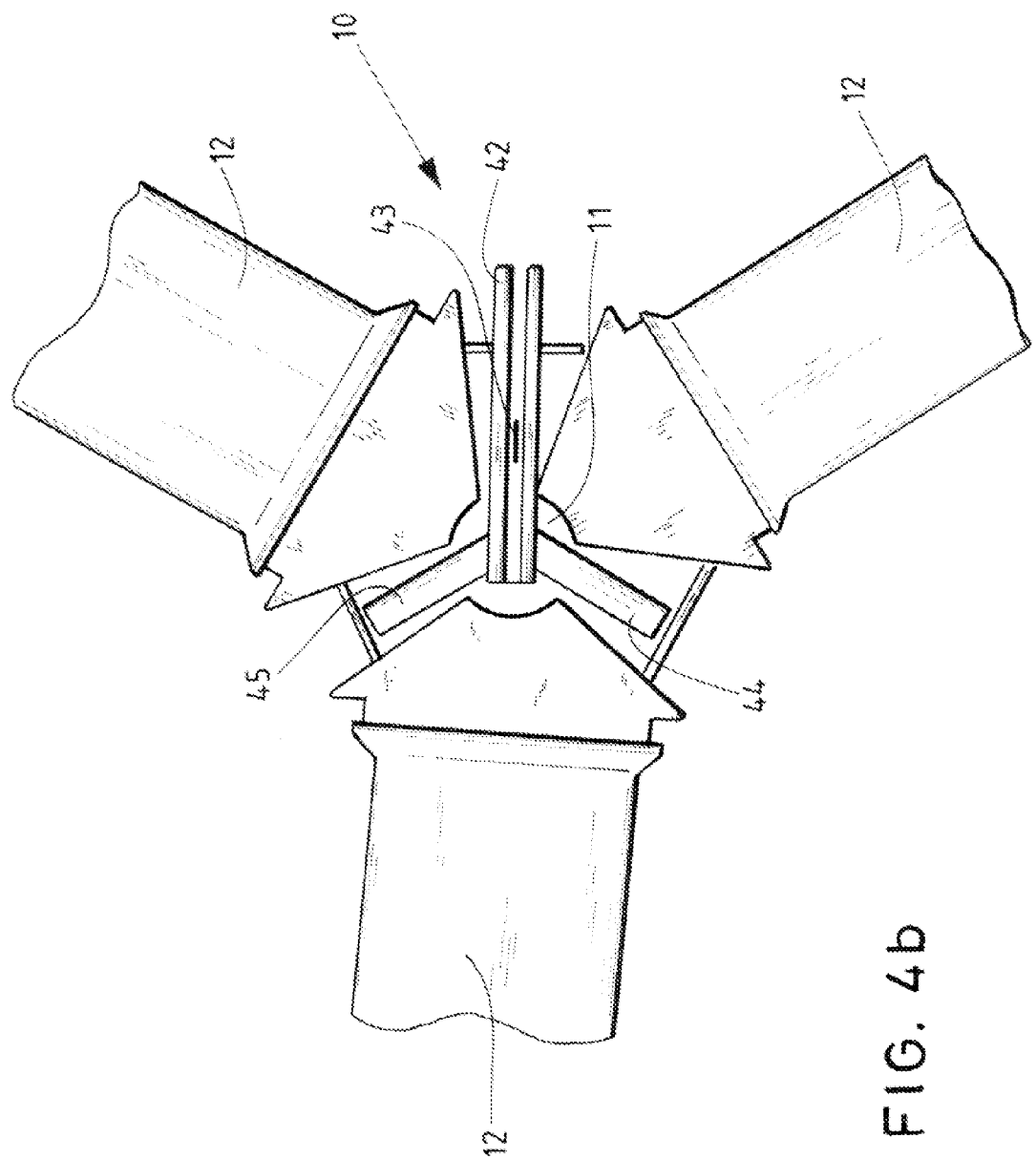

ERECTING A WIND POWERPLANT

BACKGROUND OF THE INVENTION

1. Field of the Invention

The present invention relates to handling a wind powerplant's rotor hub or its rotor, using a hoist, in particular for erecting a wind powerplant or for assembling/dismantling a rotor to/from a wind powerplant. Moreover, the present invention relates also to a mechanism used to handle a wind powerplant's hub, hereafter hub, or its rotor, especially for erecting a wind powerplant or for assembling/disassembling a wind powerplant's rotor to or from it. The present invention again concerns using a tilting mechanism when erecting/disassembling a wind powerplant.

2. Description of Related Art

A large number of steps must be accomplished to erect a wind powerplant. Once its erection site has been made ready, various components of the wind powerplant are moved to its erection site. For example, several tower segments are assembled to each other to constitute one tower during erection, whereupon a crane deposits a nacelle on the tower and affixes it to said tower's top side. Next the rotor—which consists of a hub bearing rotor blades—is assembled and is deposited by a main crane plus an accessory crane on a rotor shaft at the nacelle. Alternatively, the hub first would be mounted on the rotor shaft, as a result of which, then using cranes or other accessory means, the rotor blades are affixed to the rotor's flange connections.

The rotors of present-day wind powerplants of the 5-6 MW class are heavy and their diameters are substantial. For example, the rotor diameter of the wind powerplant of the 5 M design made by the applicant is about 126 m. Assembling a rotor by mounting its rotor blades to a hub on the ground requires a large area that must be free of obstacles and be both plane and stable. For example, a clear assembly area of more than 5,000 $m^2$ is required for a rotor diameter of 100 m.

Also, much labor is required in raising a rotor that was assembled on the ground, as appropriate rotation is required once it is raised in the air. For example, when assembling a rotor designed for applicant's 5M powerplant, two cranes plus (passive) hoists are used which partly engage the outer rotor vane zone and which, following rotor assembly, must be removed in a cumbersome and expensive manner.

BRIEF SUMMARY OF THE INVENTION

In the light of the above state of the art, the objective of the present invention is to improve, in a simple manner, the assembly, respectively the erection and also the dismantling of a wind powerplant, the design costs being minimized and in particular the complexity of removing the hoisting means shall be reduced.

This objective is achieved by a method for handling a wind powerplant's hub or a rotor by using a hoisting device, in particular for erecting a wind powerplant or for assembling/disassembling a rotor of a wind powerplant; in particular a hub or a rotor is or shall be thereby mounted at one assembly side to a wind powerplant tower, the rotor or the hub being raised or held by the hoisting device, the hub, in its raised state, being tilted by a tilting mechanism acting on the hub out of its initially raised position by a predetermined angle of tilt or on the rotor blade roots to tilt them out of their initial raised position by a predetermined angle of tilt.

The method preferably shall be used when erecting a wind powerplant, a rotor or a rotor hub being mounted at one assembly side to a powerplant tower, the rotor or rotor hub being raised by a hoisting device, in particular a crane, and, following raising the rotor or the rotor hub, said rotor and rotor hub in their raised state being tilted by a tilting mechanism, acting on the rotor or the rotor hub, to move them out of the originally raised position through a predetermined angle of tilt.

The present invention is based on the concept that, for instance, using only one crane as the single hoisting device, a hub, respectively a corresponding rotor with rotor hub, shall be mounted to a tower, respectively a tower nacelle, and that, following raising the rotor or the hub, by activating a tilting mechanism situated between the boom and the rotor hub, the suspended rotor shall be rotated about a predetermined tilting axis, in particular, by a predetermined angle of tilt. In this procedure the rotor, respectively the rotor hub, shall be tilted without recourse to a second (accessory) crane.

On account of the tilting applied by the tilting mechanism, for instance to a horizontal oriented rotor, this rotor as a whole when in its raised state is moved by an operation, respectively by the use of the tilting mechanism in a tilted position, to the horizontal orientation. In order to appropriately orient the rotor, one embodiment mode of the present invention provides guide cables or the like that per se do not tilt the rotor. Such tilting shall be carried out by the tilting mechanism.

To tilt the rotor hub, respectively the rotor, when the rotor hub is mounted on the hoisting device, respectively at an engagement point during its orientation, the tilting mechanism is connected to the rotor hub and the hoisting device, in particular of the boom, respectively the lifting cable running at the boom.

Moreover the controlled tilting mechanism allows accurate monitoring of the tilting position of the rotor hub, respectively of the rotor, when suspended from the hoisting device. The tilting mechanism of the present invention also allows adjustment of the slope of a rotor, respectively a rotor hub, for instance relative to a rotor shaft plane and orientation of a rotor correspondingly. In particular, implementation is by remote control in that the raised (horizontal) initial position of a rotor shall be tilted by actuating or operating the tilting mechanism at a predetermined angle of tilt.

The operation or the use of the tilting mechanism of the present invention furthermore allows—for instance when erecting offshore wind powerplants—to finish a rotor on land by mounting the rotor blades to a rotor hub and moving the finished rotor by means of a floating body, for instance a jackup barge, to the wind powerplant's erection site. Once at the erection site, the jackup barge's legs are extended, as a result of which the floating body shall be fixed in position and above the water level to a assume a stable operational position.

By solely using one crane which preferably shall also be mounted on the floating body, and by use of the tilting mechanism of the present invention, it is feasible to separate the rotor, horizontally resting on the body, from it by means of the crane and to tilt it in its raised position from the horizontal position into a tilted position whereby the rotor by its assembly side may come to rest against a nacelle of a wind powerplant and be affixed to it. Using the tilting mechanism, there is no longer a need for additional or accessory cranes for the erection, respectively for the tilting procedure, as a result of which the overall assembly of a wind powerplant shall be simplified, especially where offshore. Moreover, substantial time savings shall be attained when erecting a wind powerplant.

Accurate control or monitoring is attained by a position or angle controlled tilting of the rotor, respectively rotor hub, and as a result the rotor's inclination angle may be varied in a simple manner during assembly. Furthermore the tilting mechanism of the present invention saves an additional hoist, for example, an accessory crane or the like. Again, further accessories no longer need to be affixed to a susceptible rotor blade surface of a rotor as they were in the heretofore state of the art.

It is to be understood that within the scope of the present invention, the tilting procedural steps are reversible, and therefore the tilting method steps of the present invention are reversible in the course of wind powerplant assembly when mounting a rotor to a nacelle, as a result of which, when dismantling an assembly powerplant, the rotor—upon removal of the nacelle or rotor shaft—shall be held in place by the hoisting device and may be moved by the tilting mechanism from the upright position into a horizontal one by tilting the rotor at the hoisting device, respectively the crane. Where herebelow a wind powerplant assembly shall be described, then, within the scope of the present invention and its disclosure, this description may be construed also correspondingly including the reversible steps of powerplant disassembly.

In a further mode of implementation of the method of the present invention, latter provides that, following the raising phase, the tilted rotor hub or the rotor shall be made to rest at the assembly side of each against a hub assembly side of the tower or against a nacelle mounted on the tower. If, in such a case, a rotor or a hub shall be assembled to a wind powerplant tower, the scope of the present disclosure also includes the fact that the rotor or the rotor hub are mounted on a corresponding powerplant housing or a nacelle on a tower. Corresponding conditions also apply to dismantling the wind powerplant.

The tilting phase of a hub or a rotor shall be initiated when the tilting mechanism—designed to be an active entity—shall be actuated or switched at the hoisting means to start the tilting procedure. For example, the tilting mechanism may be fitted with a hydraulic component or a drive or the like which can be powered to implement tilting.

Advantageously too, the rotor hub jointly with at least one rotor blade affixed to it, is tilted by the tilting mechanism. In particular, the rotor blade(s) is (are) joined by corresponding flange connections to the hub, the assembly of the rotor consisting of hub and rotor blades being implemented in a planar surface, as a result of which, following its assembly, the finished rotor is configured in a horizontal position. The tilting mechanism of the present invention—which in one embodiment mode is mounted on the rotor hub—is designed in a manner that even rotors of a weight exceeding 80 metric tons, in particular more than 100 metric tons, can be tilted in the raised state.

Advantageously again, the rotor hub alone or the rotor hub jointly with at least one rotor/rotor blade affixed to it may be tilted into an assembly-ready position. Accordingly, following tipping, the rotor hub or the rotor jointly with the hoisting device, for instance a crane, may be moved closer to the tower or the nacelle to which the rotor hub shall be affixed to allow carrying out a final assembly of the rotor, respectively the rotor hub, in such a configuration.

In particular the rotor, respectively the rotor hub, shall be tilted jointly with a rotor blade affixed to it by the tilting mechanism.

Moreover, to assemble a wind powerplant, the rotor, respectively the rotor hub, jointly with at least one rotor blade mounted to it shall be mounted to the tower, respectively to a tower nacelle. In the case of wind powerplant disassembly, the rotor hub or the rotor is dismantled off the tower or the nacelle, respectively being taken off, and then being tilted by the tilting mechanism.

Advantageously, in one embodiment mode of the present invention, the tilting mechanism is connected to the rotor hub prior to raising the rotor hub, or the tilting mechanism is connected to the rotor. In this manner the rotor hub or the rotor is advantageously configured in an assembly-ready state, whereupon the tilting mechanism is mounted to the rotor hub to implement assembly.

The tilting mechanism preferably is configured between a hoisting means of the hoisting device and the rotor hub or between a hoisting means of the hoisting device and the rotor. For that purpose the tilting mechanism is fitted with an engagement point acted on by the hoisting means or by the hoisting device as a whole. The tilting mechanism is formed by inserting it between a boom or the hoisting device, for instance a crane, and the rotor hub respectively the rotor, or between a lifting cable of the hoisting device, for instance a crane, and the rotor hub, respectively the rotor, the tilting mechanism being kept passive during assembly. It is only after the rotor hub, respectively the rotor, has been raised by activating or driving or switching the tilting mechanism that tilting is carried out on the rotor suspended at a crane's hoist or configured at a hoisting means's engagement point, said tilting being implemented in the free space, respectively in the suspended condition.

Preferably such tilting is implemented by the tilting mechanism freely suspended in space from a lifting cable of the hoisting device, the rotor being stabilized as called for against wind gusts by means of auxiliary cables.

The assembly method of the present invention is furthermore characterized in that the rotor hub or rotor shall be raised, using for instance, a crane acting as the hoisting device. In such a case the crane in particular shall be situated, respectively built up, next to the wind powerplant to be erected, and in a further advantageous feature, the crane shall be an independent unit neither connected to nor mounted on the powerplant.

After the rotor has been mounted on the pipe tower's nacelle, the previous used crane is moved from the erection site to a new one.

The problem of the present invention is also solved by a mechanism for handling a wind powerplant's rotor hub or a wind powerplant's rotor, in particular for erecting a wind powerplant or for assembling/dismantling a rotor to/from a wind powerplant rotor, the mechanism being a tilting device which is fitted with affixation elements to affix it to the rotor hub and/or to the rotor blade roots mounted in the rotor hub, the tilting mechanism including an engagement point for a hoisting means, in particular of a hoisting device, whereby, in the raised state of the rotor hub at the hoisting means and when tilting the rotor hub by means of the tilting mechanism mounted on the hoisting means, the position of the rotor hub is changed, or when in the raised state of the rotor at the hoisting means, and the rotor is being tilted by the tilting mechanism mounted on the hoisting means, the rotor hub position shall be changed.

In this regard a hoisting means, for instance a boom or a lifting cable of a crane, is configured at an engagement point of the tilting mechanism, the system being fitted with affixation elements, whereby it is or shall be affixed to a rotor or a rotor hub, and being designed in a way that the rotor hub or respectively the rotor mounted on it shall be moved from the initially raised position into a tilted one over a predetermined angle of tilt by driving or actuating the tilting mechanism.

For example, a hoisting device is provided with a lifting cable running over a boom and/or a lifting cable running over a boom respectively with a hoisting means, preferably mounted on a boom, to which is connected the tilting mechanism of the present invention at an engagement point. The engagement point of the tilting mechanism is understood within this disclosure as being a force application site for the connected hoisting means. The tilting mechanism in this instance is detachably connected to the engagement point.

Within the scope of the present invention, a hoisting device which is provided with and connected to a tilting mechanism also of the present invention does denote, besides a crane, also a cable or an erection/jackup platform, for instance in the form of a jackup barge or the like.

As regards operating the tilting mechanism, one embodiment mode of the present invention provides that especially as regards the tilting phase, the distance between engagement point and the center of gravity of the rotor hub when tilting said rotor hub or the distance between the engagement point and the rotor's center of gravity shall remain substantially constant respectively during tilting. In this respect preferably the rotor hub, respectively the rotor, shall each be tilted about the particular center of gravity, the preferred axis of tilting being substantially horizontal when tilting the rotor hub, respectively the rotor.

In an alternative further embodiment mode of the tilting mechanism of the present invention, the distance between the engagement point, which is stationary especially during tilting, and the rotor hub's center of gravity during its tilting, or the distance between the engagement point and the rotor's center of gravity when the rotor is being tilted, respectively during the tilting phase, shall be changed, in particular being enlarged or reduced, depending on the tilting mechanism design. In the process, the tilting axis of the rotor or the rotor hub, which in particular runs horizontally, may be situated outside the centers of gravity of the rotor hub, respectively rotor, the tilting axis being able to change its position, that is to migrate, depending on the tilting adjusted for rotor hub or rotor, the tilting axis' horizontal orientation in particular remaining unchanged.

To assure tilting or interlocking of rotor and rotor hub in the raised state, another design of the present invention provides that the affixation element(s) of the tilting mechanism be a framework, in particular mounting frame or a trestle or an affixation bail or adapter. This design allows good, detachable connection of the rotor or rotor hub on one hand to the tilting mechanism and on the other to enable subsequent tilting.

In a further feature of the present invention, a support bail or a hoisting arm or a pivoting bail, in particular a pivoting frame or a pivoting frame or an especially curved guide rail, preferably a cross-arm, are mounted or present at the affixation element of the tilting mechanism, as a result of which, using these devices, and in particular in combination with respectively use of a drive or actuator, the raised rotor hub, respectively the raised rotor can be tilted.

Moreover the tilting mechanism may include a hoisting arm and/or a lever arm, each of said arms being configured movable or movably at the rotor hub or to a tilting mechanism affixation component or means.

One advantageous embodiment mode of the tilting mechanism includes a drive and/or an actuator. Preferably the actuator is a lifting cylinder, in particular a telescoping cylinder, or a cable winch or a cable control, in particular with cable retraction and extension features, or a rotary drive, in particular with drive pinions.

Another further embodiment mode of the mechanism of the present invention provides that the drive engages the guide rail so that, when this drive, respectively motor, is actuated, tilting of the rotor hub, respectively rotor, shall be initiated by the tilting mechanism respectively to externally control tilting.

To assure accurate displacement during tilting, preferably the guide rail engaged by a drive (motor) is provided with a gear rim or with a rim of bolts or a roller chain.

The tilting mechanism can be designed and handled in simple manner by mounting the drive at the hoisting means of the hoisting device or the engagement point or the guide rail.

The objective of the present invention moreover is achieved by using a tilting mechanism to erect or dismantle a wind powerplant, the wind powerplant being designed in the manner described above, in particular when using a hoisting device.

By using a tilting mechanism for or when erecting or dismantling a wind powerplant, a hoisting device may raise a rotor or a rotor hub and in particular the rotor hub or rotor is or shall be mounted on a wind powerplant tower, the tilting mechanism being configured between the hoisting means—for instance a hoist boom or a lifting cable of the hoisting device—and the rotor hub, respectively the rotor, whereby the rotor hub or the rotor shall be tilted by the tilting mechanism with a predetermined angle of tilt out of the initial raised position by means of driving or actuating the tilting mechanism.

Further advantageous designs of the tilting mechanism of the present invention were already comprehensively discussed above and are explicitly referred to hereby. The scope of the present disclosure also allows a combination of a hoisting device, for instance in the form of a hoisting crane, a jackup platform such as a jackup barge or the like, with a tilting mechanism of the present invention.

In the sense of the present invention, the tilting mechanism is temporarily used to mount or dismantle components of a wind powerplant, in particular the components such as rotors or rotor hubs are moved into an assembly-ready position after they have attained their raised positions and are moved into a tilted position by driving the tilting mechanism, the invention allowing for the skipping of the use of other hoist means to convey a rotor or a corresponding component into an assembly-ready position at a predetermined inclination angle or angle of tilt.

The invention is discussed below without thereby limiting the general concept of the present invention, using illustrative embodiments and in relation to the appended drawings, explicit reference being made hereby that the drawings should be consulted where inventive details are not further discussed in the disclosure's text.

BRIEF DESCRIPTION OF THE DRAWINGS

FIGS. 4a, 4b are a topview of a rotor and a sideview.

In the Figures discussed below, to obviate renewed discussions, identical or similar parts are denoted by the same reference numerals.

DETAILED DESCRIPTION OF THE INVENTION

Figure 1A:
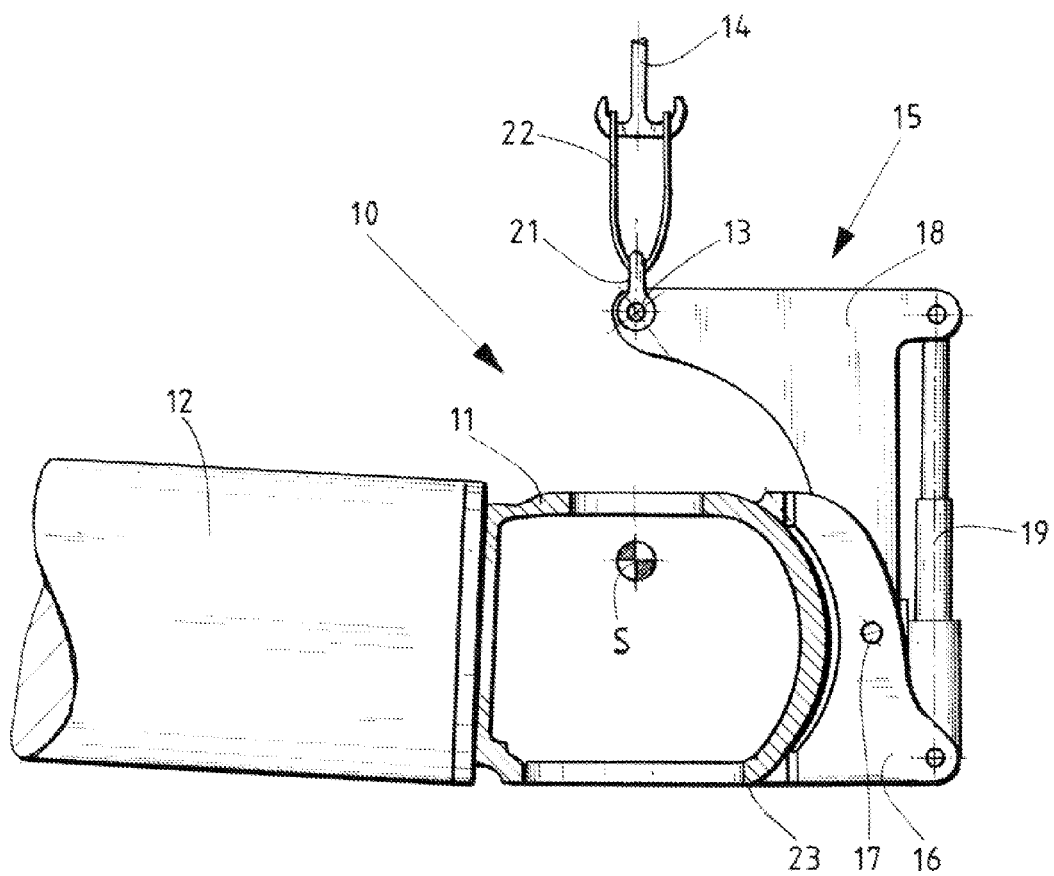
FIGS. 1a, 1b are cross-sections of a rotor which is suspended from a crane and shown respectively in a substantially horizontal and tilted positions, FIGS. 2a, 2b each are schematic sideviews of further embodiments of a rotor suspended from a crane.

FIG. 1a is a schematic sideview of a wind powerplant rotor 10 in its raised state, where this rotor 10 comprises a schematic cross-sectionally shown rotor hub 11 and shows a rotor blade 12 mounted on the rotor hub 11.

In particular, the rotor hub 11 is fitted with several, preferably three equidistant, rotor blades 12 that are joined by flanges to it. Only one rotor blade is shown for clarity.

The rotor 10 was mounted in its horizontal state on a free, planar surface. Such assembly, for example, may be carried out at a wind powerplant erection site. In case the wind powerplants are erected offshore, the rotors 10 may be finished on land in their horizontal state and then be moved by a floating body to the erection site. At this erection site, the rotors 10 are raised out of their initial horizontal position by means of a crane provided with a boom and with a lifting cable in a manner that said rotor is suspended in a horizontal position from a hook 14 or a grappling block or the like. The weights of the rotors to be installed of a 5 to 6 megawatts wind powerplant are typically 120 and more metric tons.

The cranes, respectively hoists, used for example are cranes such as described in the German patent document DE 100 28 513 A1. There term "crane" used hereafter explicitly shall refer to this document where further details are desired. The German patent document DE 100 28 513 A1 discloses a method and equipment to assemble a wind powerplant using cranes.

The present invention comprises a tilting mechanism 15 which is configured between the rotor hub 11 and the hook 14 and which was affixed to the said rotor hub before raising the rotor 10. Both the rotor hub 11 and the tilting mechanism 15 are provided with matching affixation elements.

The tilting mechanism 15 comprises an affixation adapter 16 detachably connected to the rotor 10, respectively the rotor hub 11. For example, screw connections are used between the affixation adapter 16 and the rotor hub 11. For example again, the affixation adapter 16 may be designed as a completion framework with a corresponding affixation element.

The tilting mechanism 15 furthermore comprises a pivotable lever arm 18 being pivotably affixed by bolts 17 to the affixation adapter 16 or to a base. The lever arm 18 may pivot, that is tilt, about the bolt 17 and about a pivot axis running colinearly with the bolt 17. A hydraulic cylinder 19, respectively a telescoping cylinder, is configured on the rear side of the tilting mechanism 15 between one end of the affixation adapter 16 and the upper top end of the lever arm 18.

At its end facing the hook 14, the lever arm 18 comprises an upper head-like widening above the center of gravity S, the first end of the upper head-like widening being connected by means of a shackle 21 and a cable 22 to the hook 14. At the end of the lever arm 18 opposite the shackle the hydraulic cylinder 19 is connected to the lever arm. This lever arm 18 rests by means of a bolt or the like against the engagement point 13 on the base 21 which is a part of a crane's hoisting means or of another hoisting device.

FIG. 1a shows the hydraulic cylinder 19 in an extended position whereby—when the rotor 10 is configured horizontally—the shackle 21 is situated above the schematically shown center of gravity S of the rotor 10. When the hydraulic cylinder 19 is extended, the rotor 10 is raised substantially, keeping its horizontal orientation.

At an appropriate height, the hydraulics, respectively the control of the hydraulic cylinder 19, respectively the tilting mechanism shall be activated, the hydraulic cylinder 10 is retracted with simultaneous tilting of the rotor 10 into a correspondingly tilted position while being freely suspended from the hook 14 of the crane being used.

Figure 1B:
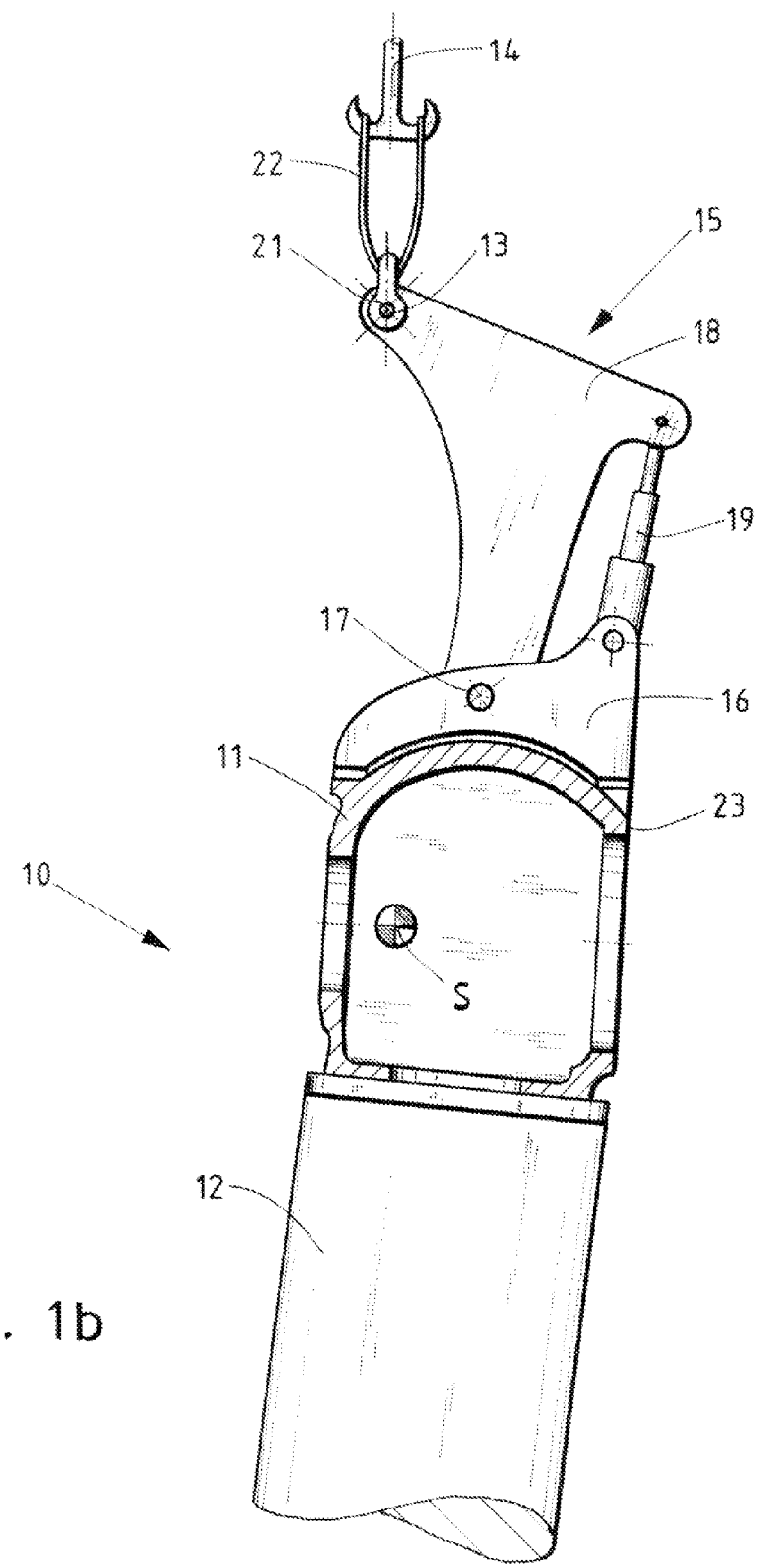

FIG. 1b shows the rotor 10 in an appropriately tilted upright position so that, for example, the rotor 10 together with its rotor hub 11 can be raised to a corresponding rotor shaft's nacelle and then can be oriented there by means of the crane being used and next be affixed at its back side to a nacelle or to the tower. For example, the back side 23 of the rotor hub 11 is flange-mounted to a matching flange.

In one alternative design of the present invention, the lever arm 18 is mounted by means of a pivoting frame or the like to the affixation adapter 16.

It is feasible within the scope of the present invention that while using the same components of the tilting mechanism 15, in order to attain simplified handling of said tilting mechanism, this mechanism used to assemble a wind powerplant shall differ in the configuration of said components from the mechanism used to dismantle such a powerplant.

Tilting or pivoting the rotor 10 into the raised position is implemented exclusively by driving the tilting mechanism 15 whereby the rotor 10 is moved or oriented into an assembly-ready position to be assembled to a tower.

Figure 2A:
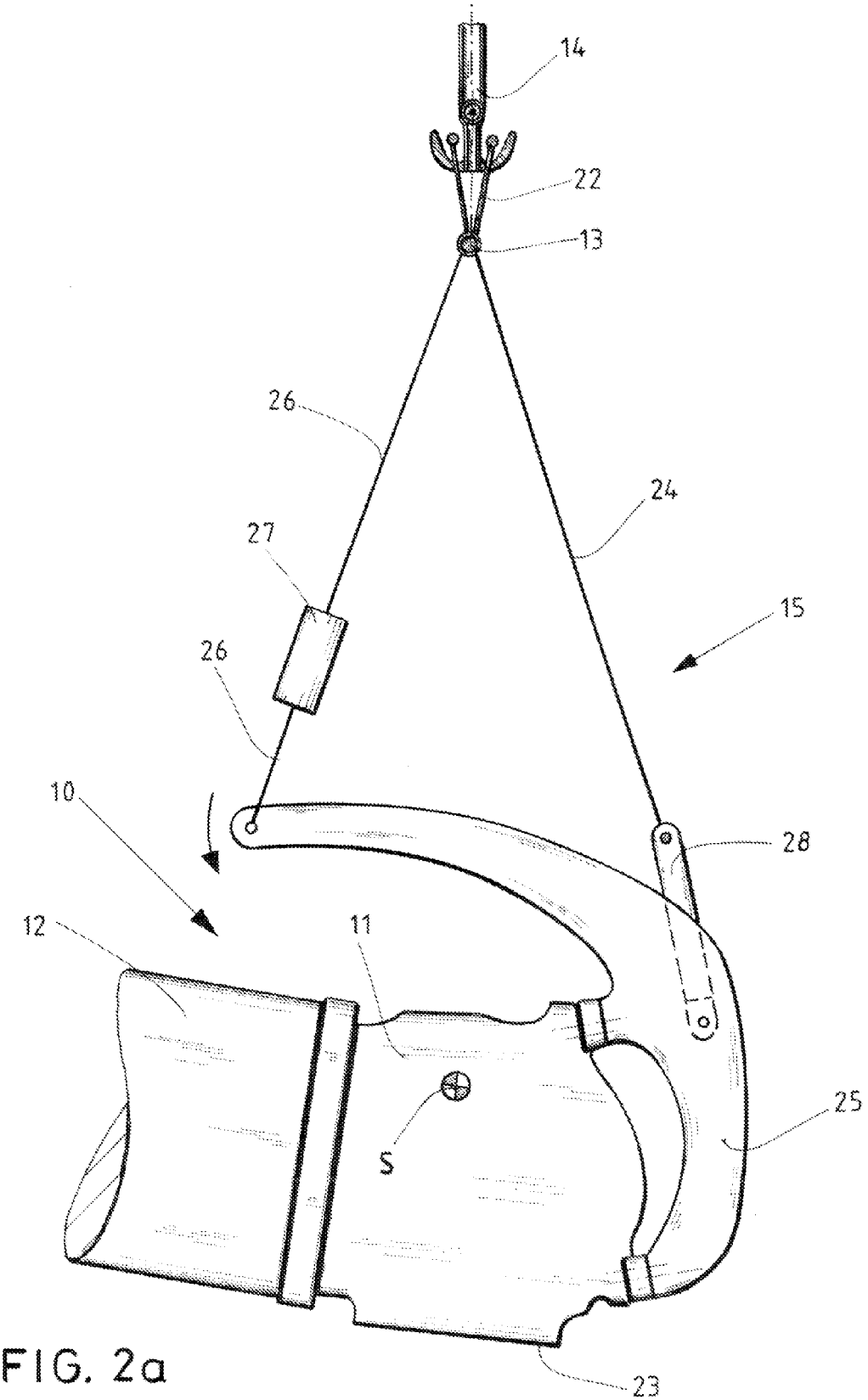

FIG. 2a shows another illustrative embodiment comprising a tilting mechanism 15. The rotor 10 is raised and retains a substantially horizontal attitude. A curved hoisting arm 25 is detachably connected to the front side of the rotor hub 11 and to the back side 23 of the rotor hub 11.

The hoisting arm 25 is curved, a cable 26 being linked to its end facing the hook 14, respectively the upper end of the hoisting arm 25, and resting against the engagement point 13 of the hoisting means. The cable 26 runs from the upper engagement point of the hoisting arm 25 to the engagement point 13, with insertion of an adjusting element 27, to the engagement point 13 at the hook 14 which is configured at the not shown crane, respectively a not shown boom. A second cable 24 of constant length acts on the engagement point 13 and is connected to an arm 28 displaceably mounted on the hoisting arm 25, the arm 28 being situated opposite the upper end of the hoisting arm 25.

The adjusting element 27, which for example, is a winch or chain drive or a spindle or also a hydraulic cylinder, elongates the cable 26 to move the rotor 10 into a tilted, upright and preferably assembly-ready position. Next the rotor 10 is affixed or flanged by its back side 23 to a nacelle. After assembly of the rotor 10, the hoisting arm 25 and the cable 26, the adjusting element 27 together with the displaceable arm 28 shall be disassembled from the rotor 10.

Figure 2B:
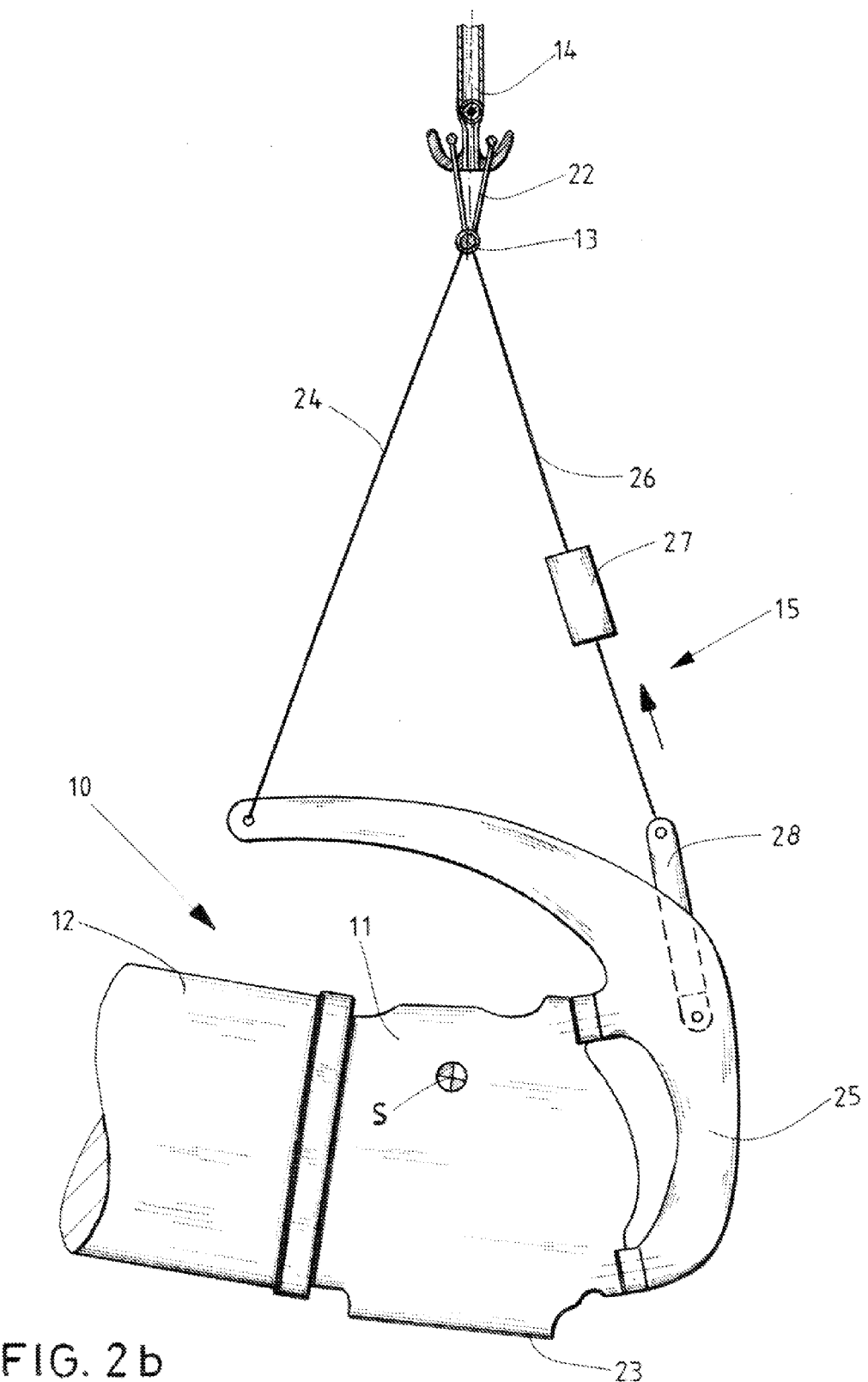

In the tilting mechanism embodiment shown in FIG. 2b, the cables 24, 26 are interchanged relative to the embodiment of FIG. 2a. Similarly the adjusting element 27, which for example is a cable winch, also is configured on the other side. To tilt the rotor 10 in the embodiment of FIG. 2b, the length of the cable 26 is reduced by the adjusting element 27. As a result, the distance between the engagement point 13 and the center of gravity S of the rotor 10 also is reduced. As regards the embodiment of FIG. 2a, the tilting of the rotor 10 due to lengthening the cable 26 results in enlarging the distance between the engagement point 13 and the center of gravity S.

Advantageously, tilting while enlarging the distance between the center of gravity and the engagement point does not require external energy, for instance oil in a hydraulic cylinder may be discharged through a hydraulic valve and a stop into an unpressurized tank. On the other hand, reducing the distance between the center of gravity when tilting the shown configuration, drive power shall be needed that may be tapped at an internal combustion engine, electric batteries or a hydraulic pressure storage.

Figure 3:
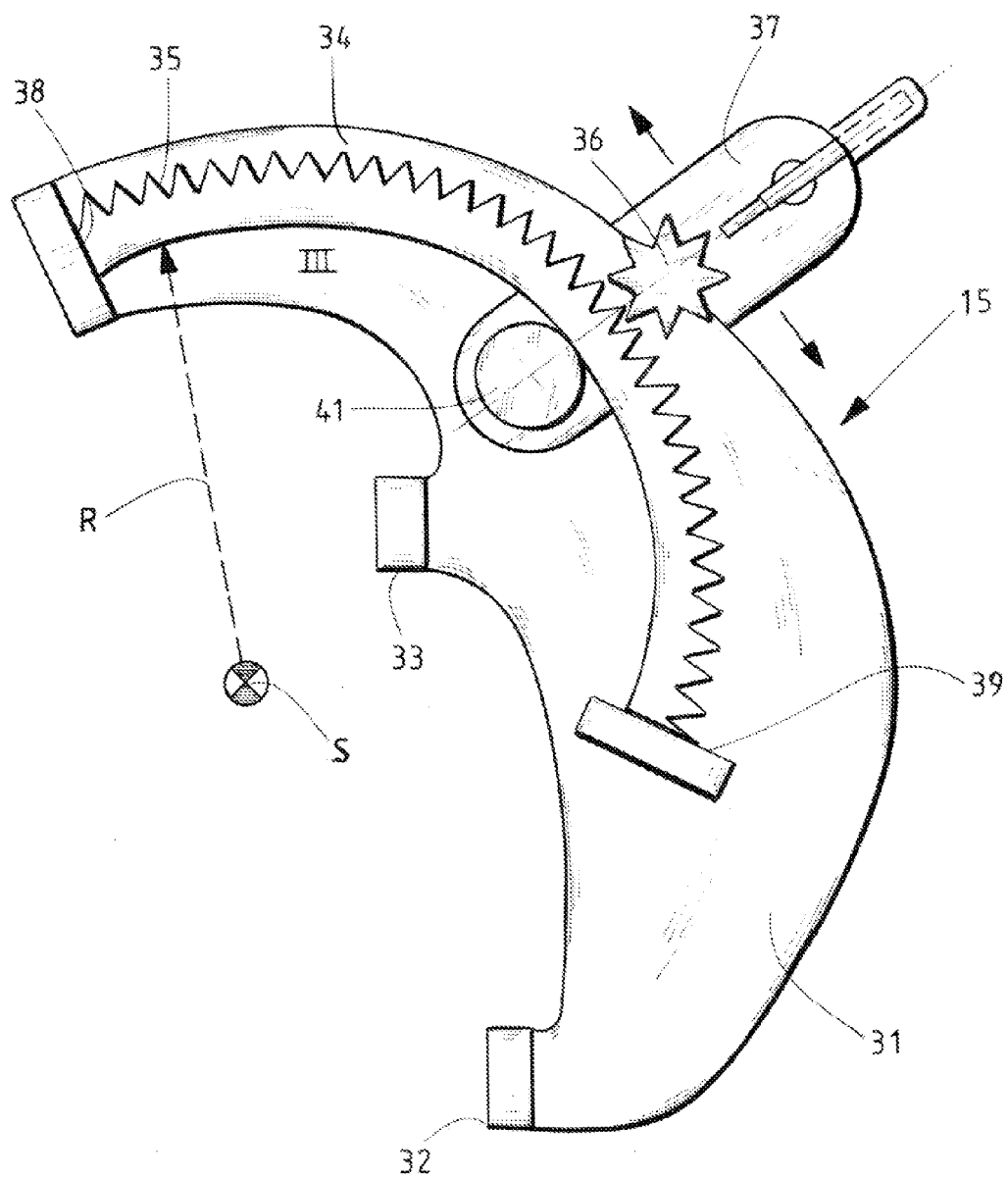
FIG. 3 is a partial schematic sideview of a component of a tilting mechanism of the invention.

FIG. 3 is a schematic sideview of a bridging or arching or cheek-like component 31 of a further tilting mechanism 15 of the present invention. This component 31 is fitted with connectors 32, 33 by means of which it is mounted on a rotor hub.

In this design the contact site of the connector 32 is affixed to the back-side zone of the rotor hub and the connector 33 to its front side zone.

The component 31 comprises a curved, arm-like extension 34 in turn fitted with an inward circularly bent arcuate gear segment 35. The arcuate gear segment 35 is circular in such a way that the distance, respectively the radius R, from the rotor's center of gravity to the inside of the arcuate gear segment 35 is constant. The teeth of the arcuate gear segment 35 engage a drive pinion 36 of a hookup element 37. In order to guide/displace accurately the hookup element 37 on/along the arcuate gear segment 35, it is fitted with a support in the form of a roller 41 rolling on the arcuate, respectively curved, inside of the arcuate gear segment 35, as a result of which said arcuate gear segment is configured between the support roller 41 and the drive pinion 36.

The drive pinion 36 is actuated into rotation by an actuator and as a result the rotation of the drive pinion 36 moves the hookup element 37 along an arcuate path, the support roller 41 transmitting the hoisting force rolling along the circular inside of said arcuate gear segment 35. During the tilting or pivoting motion, the distance between the hoist engagement point and the rotor hub center of gravity remains substantially constant. In a manner known per se, the hookup element 37 is connected to a hoisting means such as a lifting cable, respectively a crane's hook, at an engagement point when or after the component 31 has been mounted on said rotor hub.

If a rotor hub to be raised rests by its back side on the ground, the hookup element 37 shall be mounted in the zone of the left stop 38 of the arcuate gear segment 35. If the rotor hub, respectively the rotor, must be tilted, respectively rotated, while in the suspended condition, then a hookup element 37 is displaced by moving the drive pinion 38 toward the second stop 39 until the rotor hub, respectively the rotor, shall assume a predetermined angle of tilt.

The actuators for the drive pinion 36 illustratively may be electrical or hydraulic actuators or also electrically, geared motors.

A rotor cross-section and topview are shown in FIGS. 4 and 4b, other components of said rotor 10 of the present invention than those necessary to these two drawings being omitted. To tilt the rotor 10 while in its raised state, the tilting mechanism 15, in the form of an arcuate track 42 or slide rail, is mounted on the front side of the rotor hub 11. A suspension element 43 runs inside the track 42, for instance being a trolley or the like. As shown in the topview of FIG. 4b, the track 42 is laterally affixed by affixation arms 44, 45 between the rotor blades 12 to the rotor hub 11.

Figure 4A:
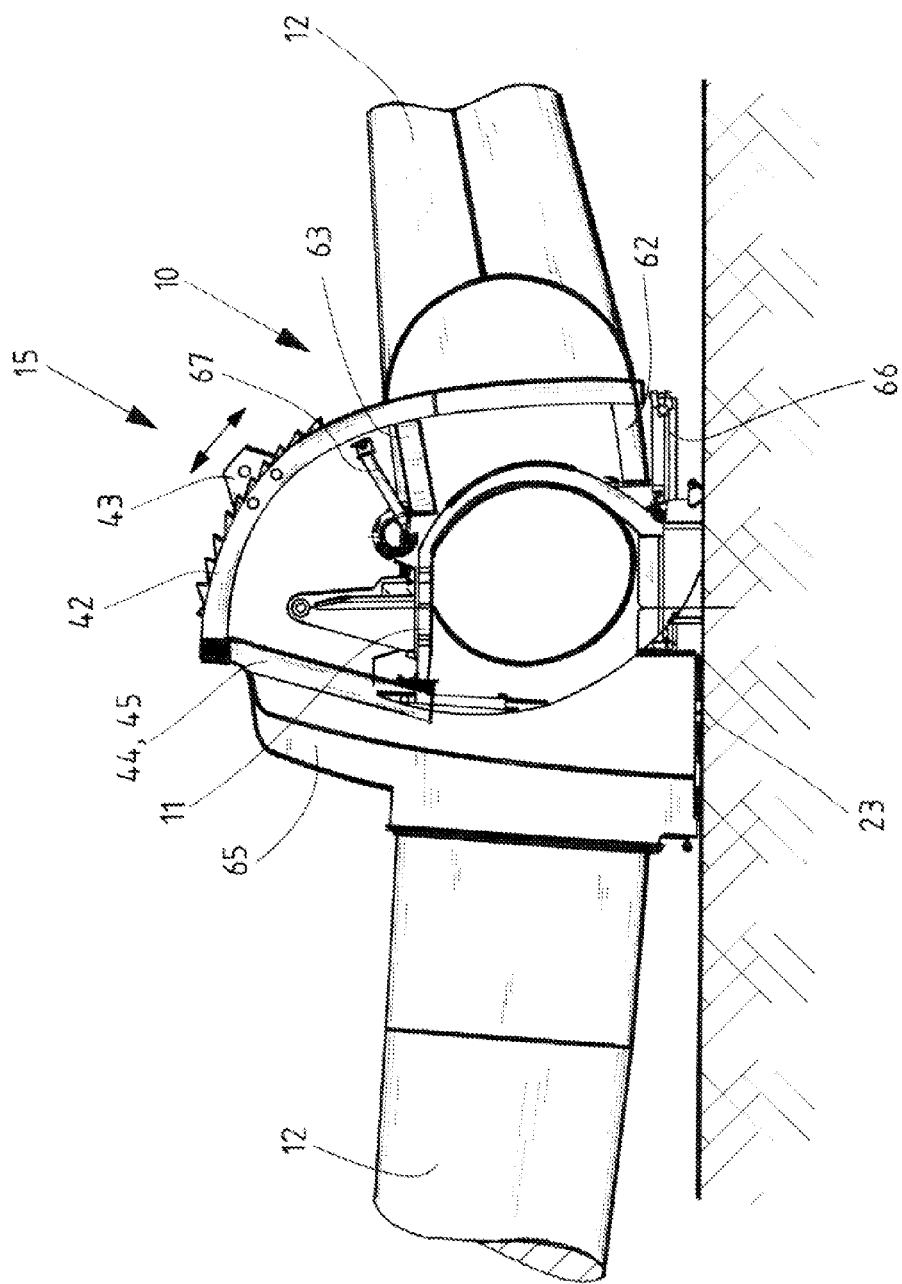

The track 42, respectively the curved slide rail, is mounted by affixation arms 44, 45, 62, 63 to the rotor hub 11. After operating the tilting mechanism, respectively the track 42 and the suspension element 43, the track 42 jointly with the affixation arms 44, 45, 62, 63 is assembled by means of said rotor hub, whereby, thereupon—at the rotor 10, in the zone of the rotor hub 11—a hub lining 65 in the form of a so-called spinner is affixed to the spinner affixation elements 66, 67. Part of the rotor hub lining 65 is shown in FIG. 4a.

After the tilting mechanism together with the curved track 42 has been affixed to said rotor hub, a suspension element will be configured at an engagement point of the suspension element, for instance a trolley with a drive.

In the raised state, the suspension element 43 is displaced by a corresponding motor drive for example along a gear rim or the like on or inside the track 42, whereby the entire rotor 10 shall be tilted about a tilting axis and be moved in this attitude into an assembly-ready position. Then the rotor is moved against a rotor shaft on a nacelle and assembled.

Figure 5A:
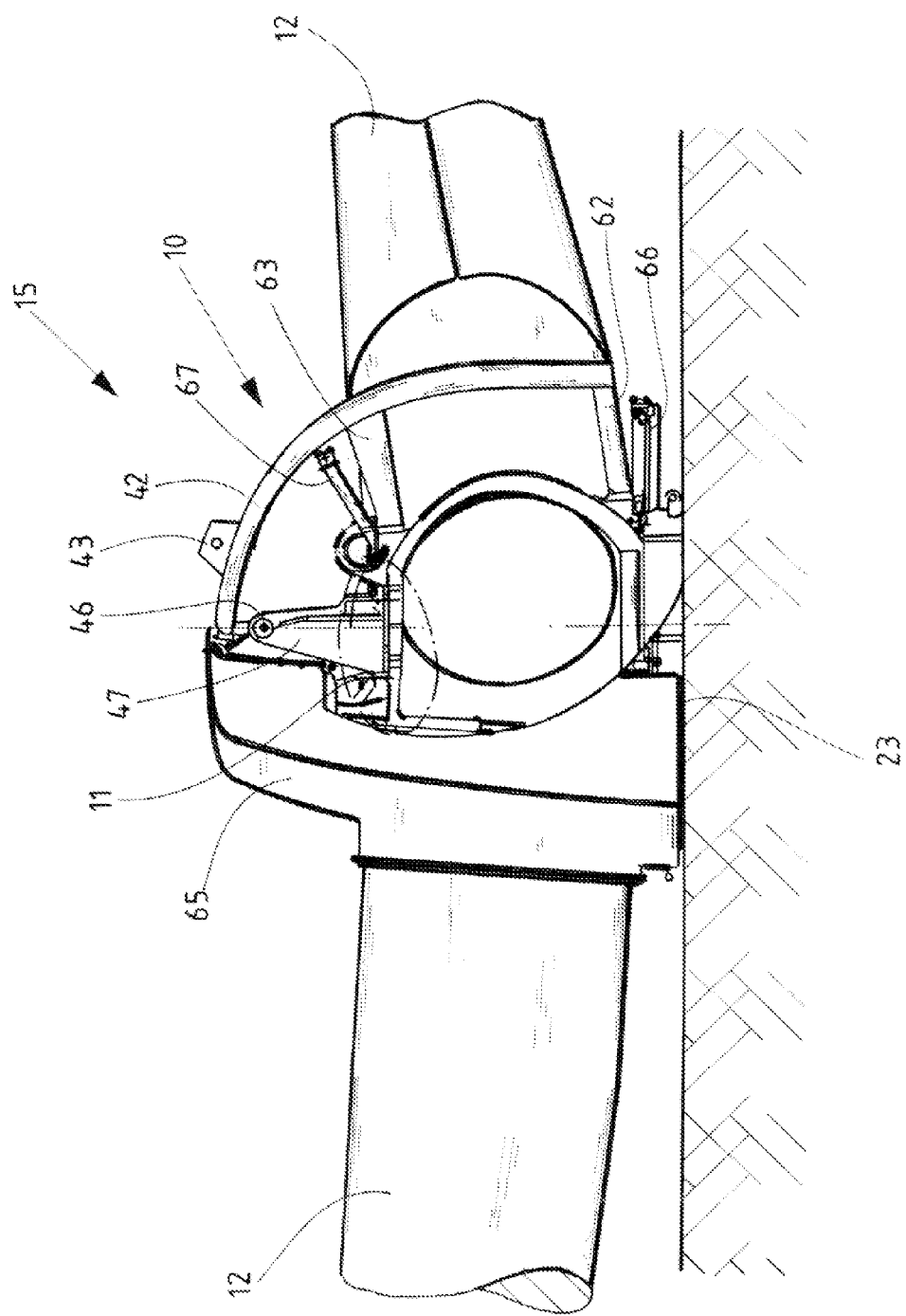
FIGS. 5a, 5b are respectively a sideview and a topview of a rotor, and FIGS. 6a, 6b respectively are a sideview and a topview of a rotor.
Figure 5B:
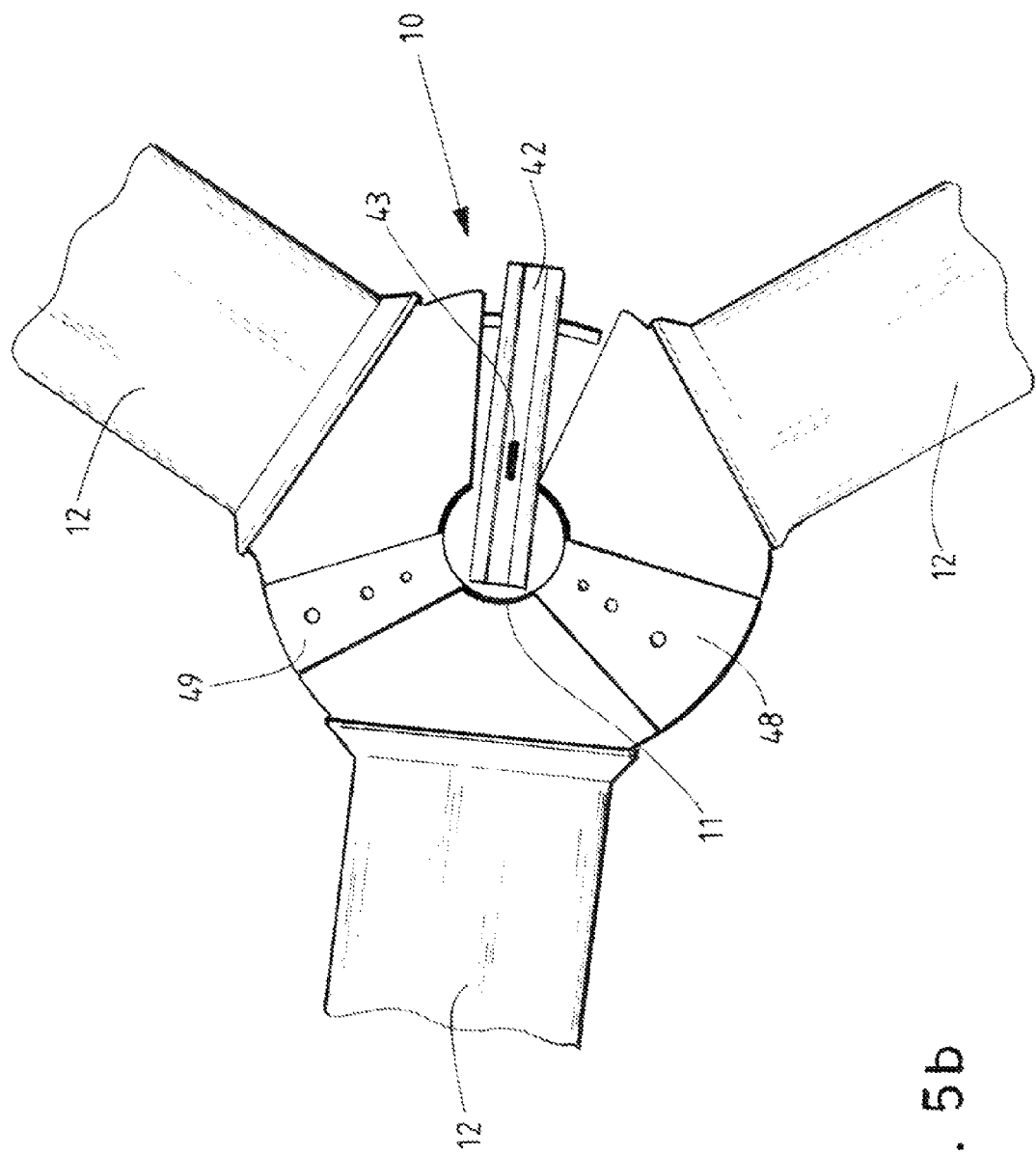

FIGS. 5a and 5b show that the arcuate track 42 is connected by a bolt connection 46 directly to the rotor hub, respectively a junction element 47, of the rotor hub 11. Moreover, to stabilize the tilting mechanism as regards the tilting procedure, the track 42 shall be affixed by means of (not visible) affixation arms 44, 45 situated underneath the hub lining 65 and laterally between the other rotor blades 12. In this manner the hub lining 65 may be substantially assembled prior to raising the rotor, preferably the affixation arms 44, 45 being covered with lining segments 48, 49 after assembly of the tilting mechanism 15.

As regards a three-blade rotor 10, tilting is carried out in a manner that in particular one rotor blade shall point down and the other two blades point obliquely upward from the rotor hub. In this configuration the rotor assumes its so-called Y position.

As regards the illustrative embodiment mode of FIG. 5a, the track 42, respectively the slide rail, is directly connected to the junction 47, this feature providing a compact tilting mechanism. In this design the junction 47 is mounted as a stop to the hub's entry flange 68 when transporting the rotor hub 11. Following assembling or dismantling the rotor 10, the track 42 and the junction 47 are disassembled from the rotor hub, the affixation arms 62, 63 remaining on the rotor hub or being also detachable. Thereupon only the lacking lining segment 48, 49 of the hub lining 65 shall be assembled to the spinner affixations 66, 67.

As regards the illustrative tilting mechanism embodiment of FIGS. 5a, 5b, said apparatus is connected underneath the spinner to the hub, whereas in the embodiment modes of FIGS. 4a, 4b it is configured outside the spinner. Following assembly of the rotor 10 to a tower respectively a nacelle, wherein the shaft flange was connected to the rotor shaft, the tilting mechanism is detached, whereby the hub lining 65 subsequently may be affixed to the affixation elements 66, 67.

In an especially preferred manner, the affixation arms 44, 45, 62, 63 and the affixation elements 66, 67 are one and the same components and remain on the rotor hub. Advantageously and alternatively, the affixation arms 44, 45, 62, 63 are dismantled and the affixation elements 66, 67 are affixed at the same affixation sites to the rotor hub.

Figure 6A:
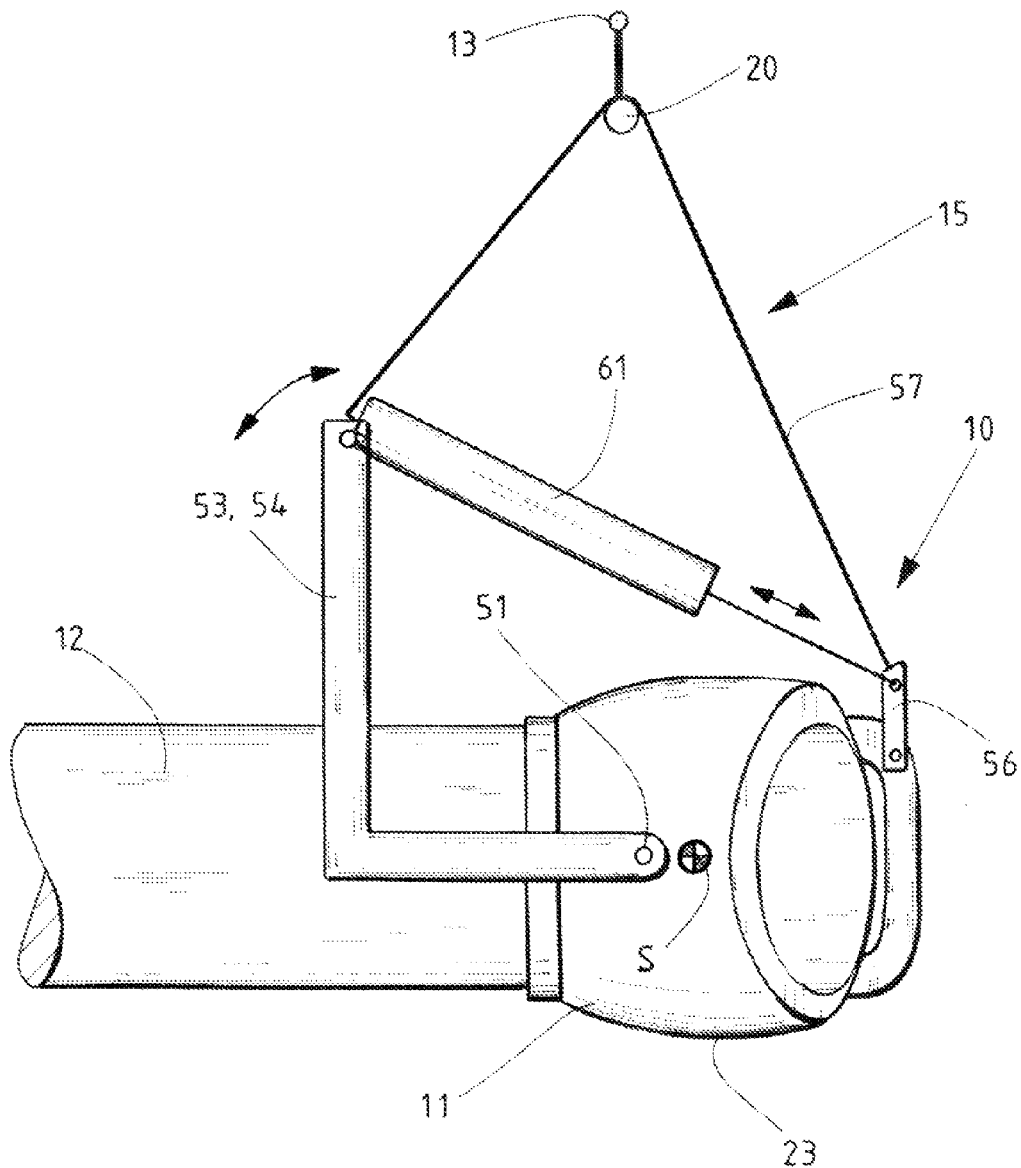
Figure 6B:
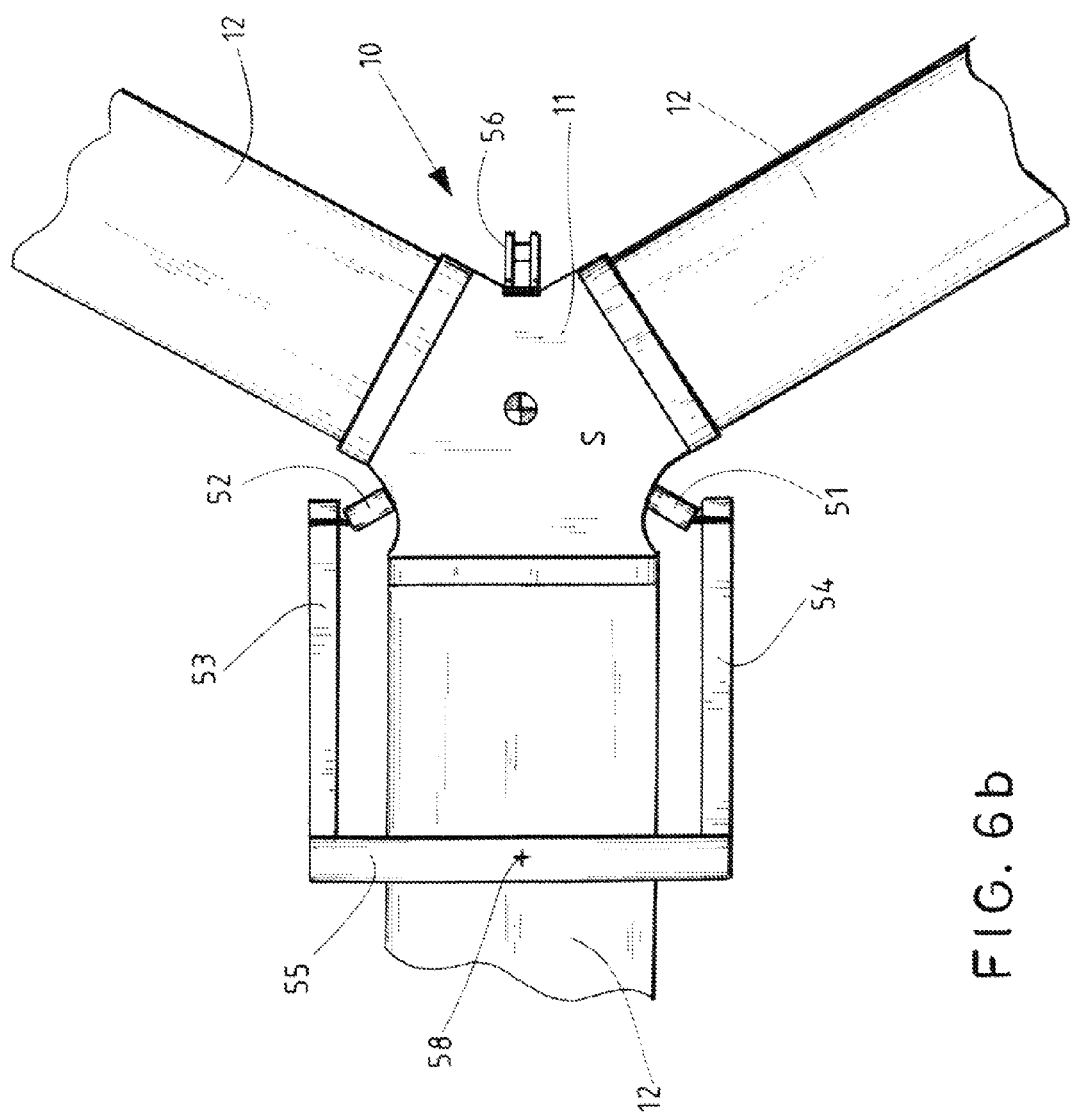

FIG. 6a is a schematic sideview of a further embodiment mode of the tilting mechanism 15 of the present invention. FIG. 6b is a topview of the rotor.

A sideview L-shaped support arm 53, 54 is affixed by affixation elements 51, 52 on each side of a rotor blade 12. A corresponding cross-bar 55 is configured between the support arms 53, 54. A displaceable lever arm 56 is configured opposite the crossarm 55 at the free site between the opposite rotor blades 12 and is connected by a cable 57 to the opposite affixation and center point 58 of the crossarm 55. In this design the cable 57 runs over a roller 20 with an engagement point 13 and engaging a hoisting means.

Moreover, the tilting mechanism 15 comprises a schematically indicated lifting cylinder 61 configured between the crossarm 65 of the support 53 and the displaceable lever arm 56 and shown in its extended position in FIG. 6a. For clarity of exposition, the lifting cylinder 61 is omitted from FIG. 6b.

In the initial horizontal orientation of the rotor 10, the lifting cylinder 61 is extended and, as a result, following raising the rotor 10 by means of the crane, said cylinder is retracted and consequently the relative rotor position has been changed by a predetermined angle of tilt depending on the position of the (retracted) cylinder.

Figure 7A:
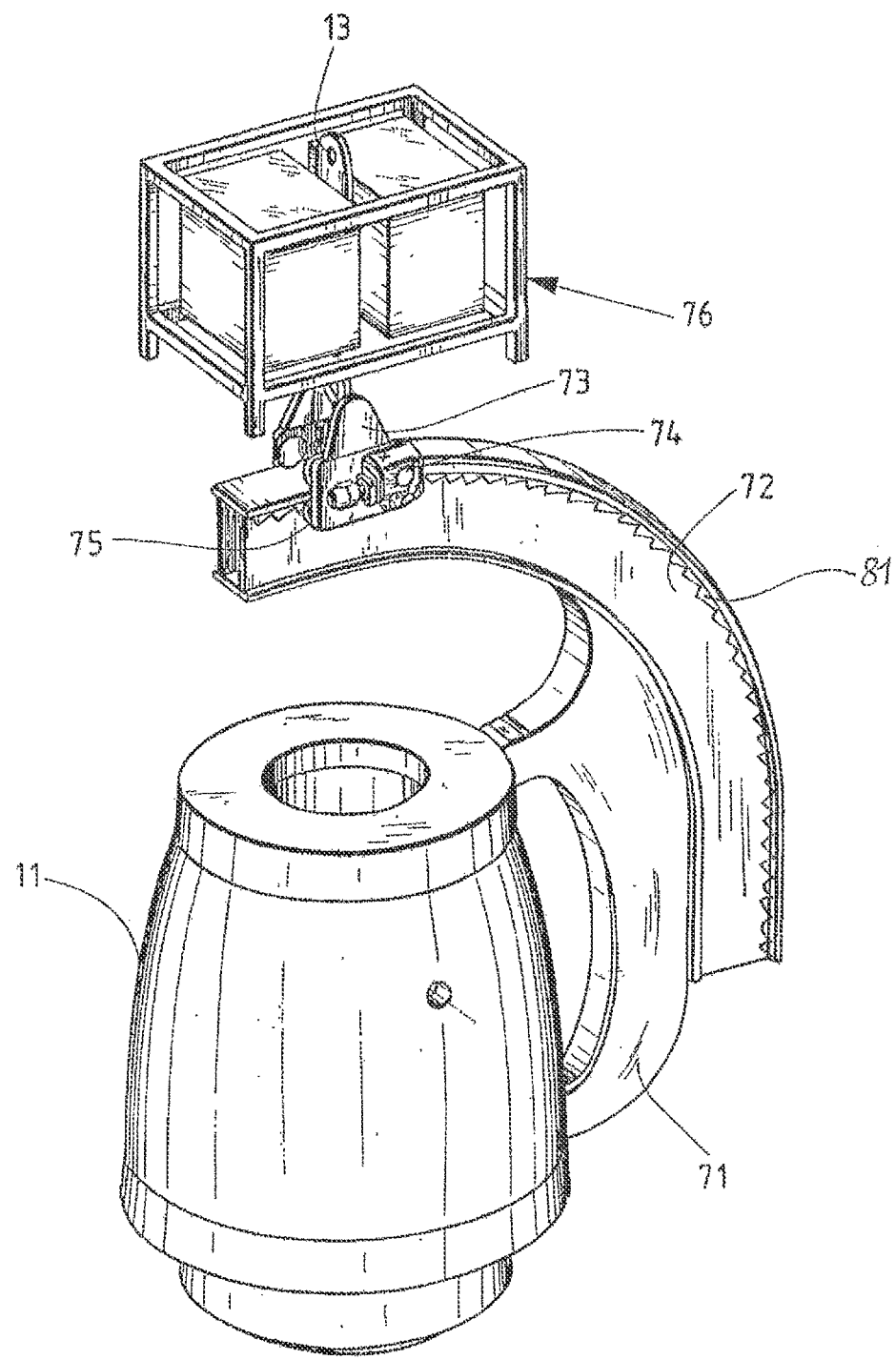
FIGS. 7a-7c are schematic perspective views of a rotor hub together with a tilting mechanism.
Figure 7B:
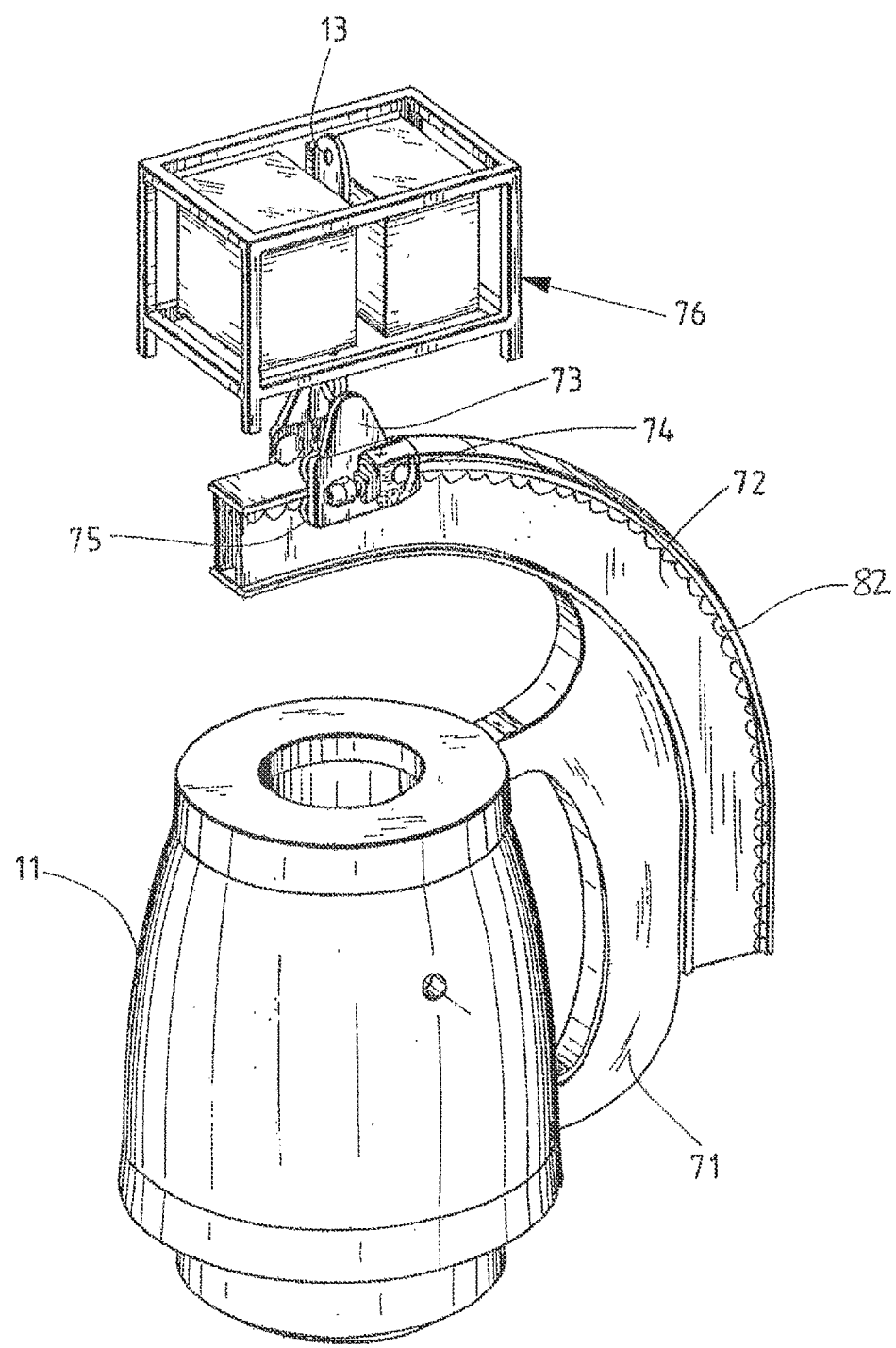
Figure 7C:
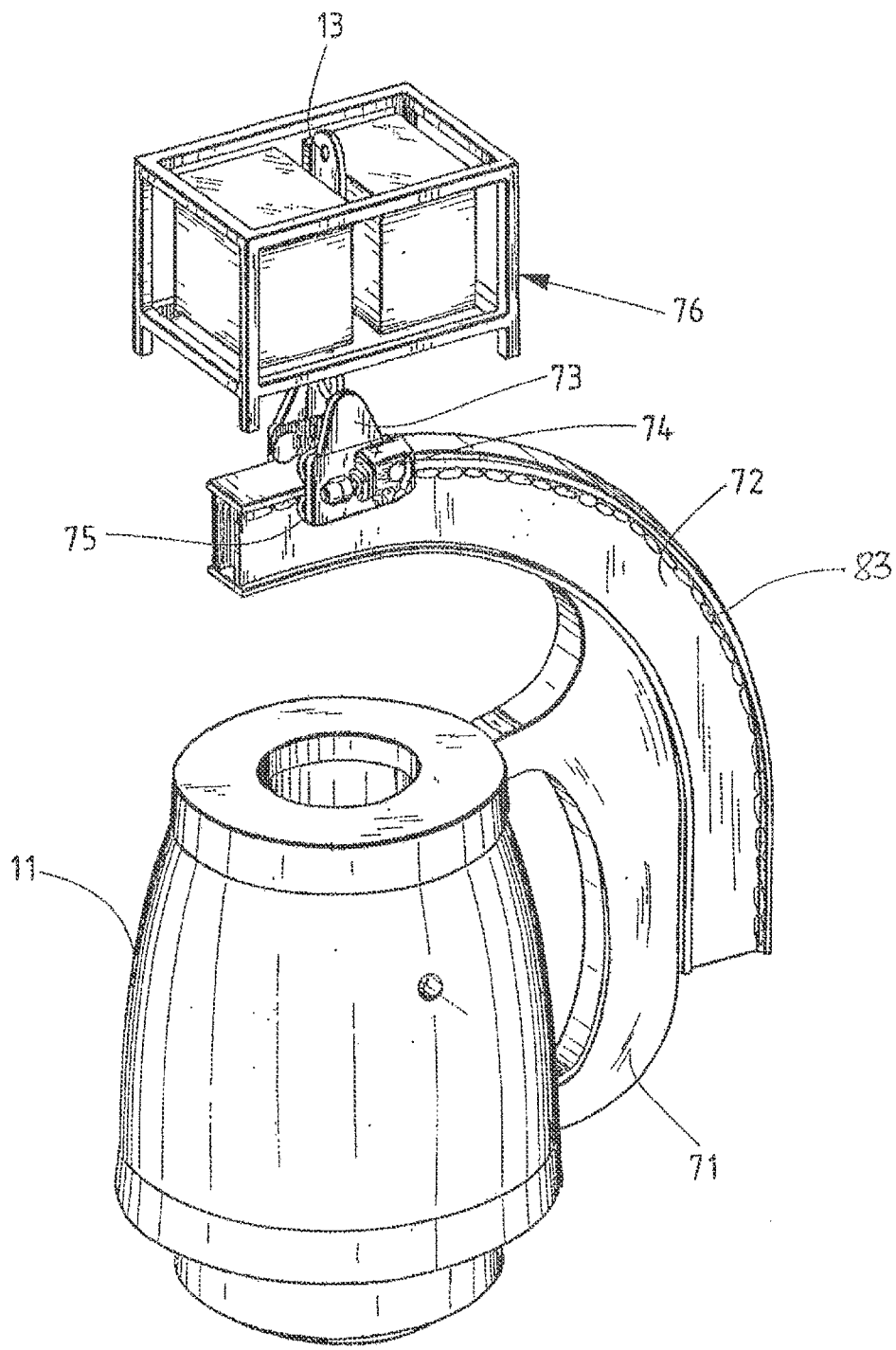

FIGS. 7a-7c are perspective views of a schematically indicated rotor hub 11 (omitting the connection flange to the rotor blades). An affixation bail 71 is affixed or configured laterally to the front side and to the rear side of the said hub and supports a circular rolling track, respectively an arcuate crossarm.

A trolley 73 is mounted at the top end of the rolling track 72 and is connected at one engagement point 13 of a hoisting means of a hoisting device, for instance a crane. An energy storage, respectively a drive unit 70, is situated underneath the support point 13 and may be in the form of an internal combustion engine that is fitted with an electric power generator, or with a hydraulic system or a set of electric batteries.

With reference to FIGS. 7a-7c, the trolley 73 is fitted with a drive 74 driving its rollers 75. The rollers 75 engage a gear or bolt rim 81, 82 or a roller chain 83 on the roller track 74, as a result of which the rotor hub 11 respectively a rotor jointly with the said rotor hub shall be pivoted along the circular track 72 about the center of gravity into an assembly position. In the process the tilting of the rotor hub 11 is implemented by the drive 74, and during said tilting the roller track 72 is displaced relative to the stationary drive respectively to the bearing site 13.

LIST OF REFERENCES 10 rotor
11 rotor hub
12 rotor blade
13 engagement point
14 hook
15 tilting mechanism
16 affixation adapter
17 bolt
18 lever arm
19 hydraulic cylinder
20 roller
21 shackle
22 cable
23 back side
24 cable
25 hoisting arm
26 cable
27 adjusting element
28 arm
31 component
32 hookup
33 hookup
35 arcuate gear segment
36 drive pinion
37 hookup element
38 support
39 support
41 roller
42 track
43 suspension element
44 affixation arm
45 affixation arm
46 bolt connection
47 junction
48 lining segment
51 affixation element
52 affixation element
53 support
54 support arm
55 cross arm
56 lever arm
57 cable
58 center
61 lifting cylinder
62 affixation arm
63 affixation arm
65 hub lining
66 affixation element
67 affixation element
71 affixation bail
72 roller track
73 trolley
74 drive
75 roller
76 energy storage/drive unit
81 gear rim
82 bolt rim
83 roller chain
S center of gravity
R radius

The invention claimed is:

1. A method for assembling/disassembling a rotor to/from a wind powerplant, where a rotor hub, or the rotor, is mounted at one assembly side to a tower of the wind powerplant, the method comprising the steps of:
providing a tilting mechanism that is affixed to at least one of the rotor hub and rotor blade roots of the rotor, wherein the rotor hub and the rotor each define a respective center of gravity, wherein the tilting mechanism includes an actuator and an engagement point, and wherein the actuator is at least one of a telescopic cylinder, a cable winch, and a control cable to shorten and lengthen a cable;
raising the rotor hub or the rotor and holding the rotor hub or the rotor with a hoisting device with a hoisting means that engages the engagement point of the tilting mechanism, wherein the engagement point of the tilting mechanism is a force application site for the hoisting means connected thereto;
tilting the rotor hub in the raised state with the tilting mechanism, out of an initially raised position by a predetermined angle of tilt or tilting the rotor from the initial, raised position through the predetermined angle of tilt with the tilting mechanism, wherein in either tilting step, the tilting mechanism is directly connected to the hoisting device and a distance between the engagement point and either the rotor hub center of gravity or the rotor center of gravity is changed, wherein the engagement point is stationary during the tilting of the rotor hub; and
providing guide cables that do not tilt the rotor or the rotor hub, but further orient the rotor or the rotor hub.

2. The method as claimed in claim 1, wherein the tilting mechanism is actuated or switched to initiate tilting.

3. The method of claim 1, wherein the rotor hub or the rotor is mounted on or dismantled from the tower or a tower nacelle.

4. The method of claim 3, wherein prior to raising the rotor hub, the tilting mechanism is connected to said rotor hub or that prior to raising the rotor the tilting mechanism is connected to said rotor.

5. The method of claim 1, wherein the tilting mechanism is disposed between the hoisting means of said hoisting device and the rotor hub or between the hoisting means of the hoisting device and the rotor.

6. The method of claim 1, wherein following the raising action, said tilted rotor hub or the tilted rotor each by its assembly side is configured against a hub assembly side of the tower or to a nacelle mounted on the tower.

7. The method of claim 1, wherein the hoisting device is a crane.

* * * * *